United States Patent Office 3,600,488
Patented Aug. 17, 1971

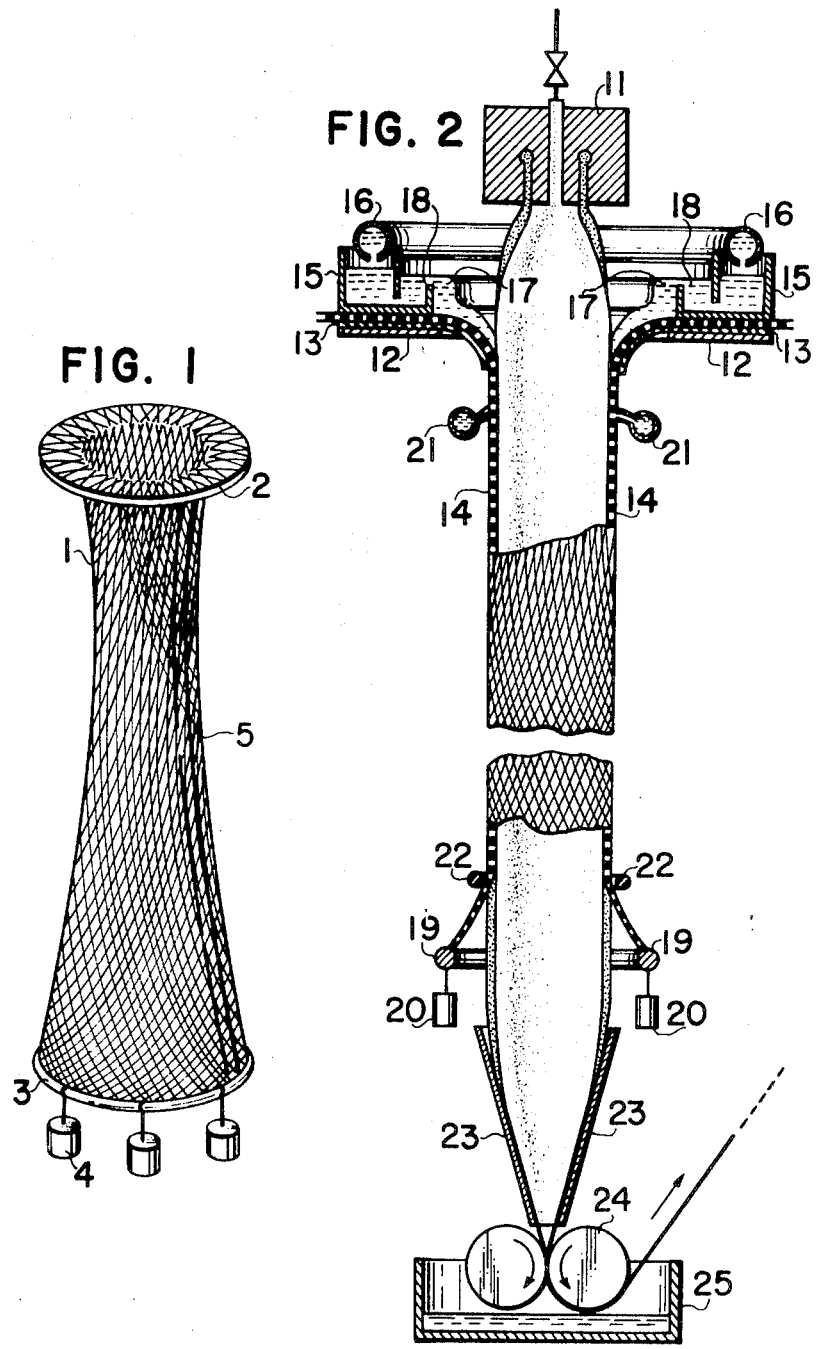

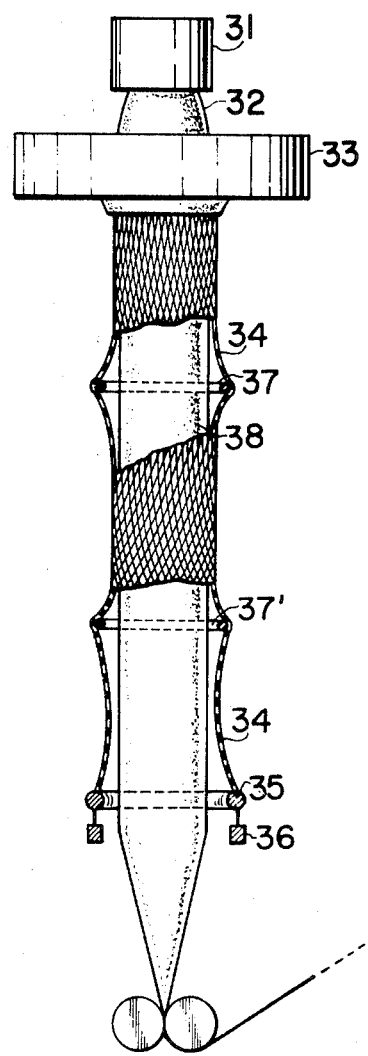
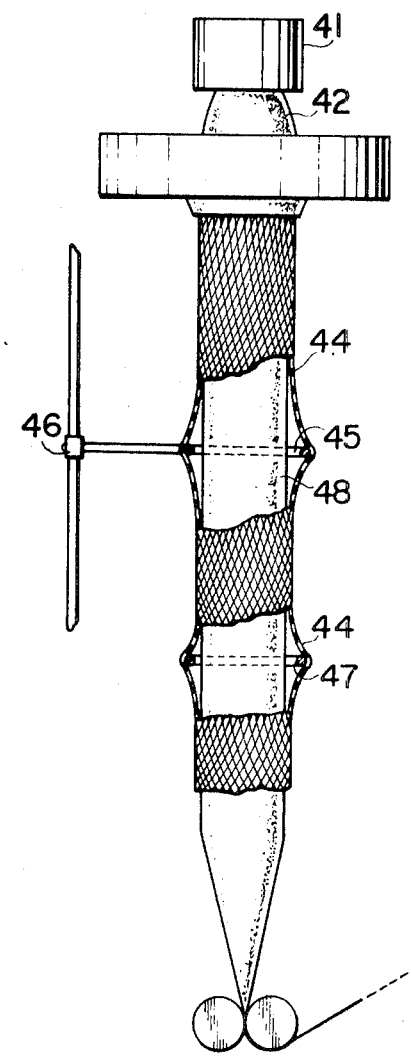

3,600,488
METHOD FOR SHAPING A TUBULAR FILM BY LIQUID COAGULATION
Masahide Yazawa, Tokyo, Japan, assignor to Polymer Processing Research Institute Ltd., Tokyo, Japan
Filed July 18, 1969, Ser. No. 842,996
Claims priority, application Japan, July 26, 1968, 43/52,864
Int. Cl. B29d 7/20
U.S. Cl. 264—95      8 Claims

ABSTRACT OF THE DISCLOSURE

A tubular film of thermoplastic polymer having any desired diameter is shaped by extruding it downwards in a tubular form from an annular die, while applying gas pressure in the inside of the tubular film, before passing the extruded film, so as to effect complete coagulation, through the inside of a cylindrical net provided in contact with a coagulation liquid which is supplied from the top of the net and flowing downwards along the surface of the net and by withdrawing the coagulated film from the lower part of the net. By adjusting the tension of the cylindrical net, the tubular film is always in light contact with a turbulent stream of the coagulating liquid without channelling of the stream, and the tubular film of any desired diameter and thickness can be readily prepared in the same apparatus.

---

This invention relates to a method for shaping a tubular film by solidification or coagulation with a liquid, and more particularly to a method for shaping a tubular film of thermoplastic polymer by extruding a solution or a melt of a polymer into a seamless tubular form from an annular die while applying gas pressure in the inside of the tubular film, namely by blown method; passing the tubular film, immediately after being extruded, through the inside of a cylindrical net provided along the passage thereof and contacting with a coagulation liquid; adjusting a tension of the cylindrical net so that the diameter of the tubular film may be made equal to the desired diameter; adjusting an opening size of circular hole of a sheet of an elastomer serving as a bottom plate of an annular coagulation liquid vessel provided at the top of the cylindrical net in order to keep the inside surface of the cylindrical net on which the coagulation liquid falls in light contact with the outside surface of the tubular film; making the tubular film coagulated by contacting with a stream of the coagulation liquid flowing down along the full length of the cylindrical net and continuously stirred by the meshes of the net; and withdrawing the shaped tubular film from the bottom of the cylindrical net, while balancing the weights of the tubular film and the coagulation liquid flowing over the descending tubular film with a frictional resistance developed between the tubular film and the tension-adjusted cylindrical net.

According to the present invention, tubular films of a considerably wide range of desired diameters can be prepared in the same apparatus not only by shaping by quenching a tubularly extruded polymer still in the molten liquid state using a cold liquid, that is, by allowing the outside surface of the tubular film to come in contact with a stirred and turbulent cold liquid along a long distance without exerting any liquid pressure perpendicular to the tubular film surface from outside, but also by wet process coagulation of a polymer solution in a long path along the circular net using a coagulant to extract the solvent from the solution so as to coagulate the polymer.

In this specification, hereinunder, a molten polymer in melt extrusion and polymer solution in wet process coagulation are collectively referred to merely as "polymer liquid," solidification and coagulation with a liquid are also collectively referred to merely as "coagulation," and a cold liquid for quenching and liquid for coagulation or coagulant of polymers are collectivey referred to merely as "coagulation liquid."

Various processes have been heretofore proposed as methods for preparing a tubular film by solidifying on quenching a tubular polymer film extruded downwardly from an annular die with cold water, among which "Manufacture of Tubular Thermoplastic" (U.S.P. No. 3,090,998 by H. W. Heisterkamp et al. assigned to Dow Chemical Co.) is well known. Said prior art teaches a method which comprises continuously applying an unconfined and free-flowing circumenveloping column of a liquid of a controlled temperature to the outside of said tube right after extrusion but before flattening said tube and then withdrawing the flattened film from the flattening device. In said prior art method, the suspension weight of the tubular film and the liquid applied to the film surface are held from the top in the most cases by the strength of the soft and weak tubular film itself just after extrusion and by the flattening device or pinch rollers from the bottom. Thus, in the case that the suspension distance is beyond a certain limit depending upon the condition of extrusion, the sort of polymer extruded, size or thickness of the film being shaped and so forth, the tubular film in the course of solidification is still soft and weak and fails to withstand the suspension weight thereof, and the unsolidified portion of the film is disadvantageously ruptured. To hold such weights, the inner wall of a slightly tapered conical solid surface provided in the inside of an annular coagulation liquid vessel or a rod ring, each having a slightly smaller diameter than the outer diameter of the tubular film is usually provided in the passage of tubular film and the weights are held by friction between said wall or rod ring and the passing tubular film. If the inside pressure for shaping the tubular film is slightly changed and the diameter of the tubular film becomes smaller the frictional resistance of the wall provided in the passage of the tubular film is reduced and at last becomes zero and consequently fails to hold the suspension weight of the tubular film, resulting in breaking of the tubular film, as stated before. On the other hand, if the diameter of the tubular film becomes larger, the frictional resistance of the wall is increased and consequently the tension in the vertical direction of the tubular film right after extrusion is reduced by piling up of the film in a clump on the wall or ring owing to the excessive frictional resistance developed. Accordingly, the diameter of the soft part of tubular film tends to expand more and more till it bursts, even under the same inside pressure for shaping, and tubular film having a stabilized diameter is hardly obtained. Thus, when the desired diameter of the tubular film is slightly changed, there is such a disadvantage that another annular wall or ring suitable for shaping a film of newly changed size must be used. Further, the "unconfined and free-flowing circumenveloping column of a liquid" flows down along the outside of the tubular film in the form of "surrounding cascade column," and the liquid flowing down along the very surface of the film is in a laminar stream parallel with the film surface and moreover the liquid tends to channel into several streams due to surface tension of the liquid after flowing down some distance say, 2 or 3 times the diameter of the film, downwards from the very line of touch of the liquid with the film, and the renewal and even flow of the liquid in contact with the film surface is insufficiently effected. The prior art method can be effectively utilized in cases where the solidification rapidly takes place only by liquid quenching relatively in short distance, as in case of the shaping of tubular films carried out by melt extrusion, but can not be utilized in cases where long coagulation time and a long coagulation course are necessary, e.g. in case where a concentrated feed solution of a polymer dissolved in a solvent is subjected to solvent extraction to effect coagulation by wet process, or in case where a relatively thick tubular film is shaped at a higher speed and a long solidification bath is necessary, or in case where the suspension weight of the tubular film becomes excessive and the film tends to be readily ruptured and makes it difficult to carry out stable operation. In these cases application of the prior art method becomes meaningless. Particularly, the cascade surrounding the film surface is not a turbulent stream but is a laminar flow which is apt to cause channelling and does not cover the full length and whole circumference of the film. Such a laminar or channelled stream, makes the effect of the coagulation liquid insufficient.

The present invention is quite free from these disadvantages of the prior art method, and is to provide a novel method for shaping a tubular film, which is applicable not only to the case of shaping of a tubular film by quenching with cold liquid where even a product having a large thickness can be shaped at a high speed, but also widely to the case of the coagulation shaping by solvent extraction.

A method for preventing channelling of the coagulation liquid supplied by a means of a knit skirt surounding the tubular film has been heretofore well known. In that case, the end of the skirt is freely suspended and only clings to the surface of the tubular film through the force caused by the surface tension of the liquid applied. Thus, the diameter of the knit product cannot be maintained constant, but varies according to the diameter of the film; hence a large frictional resistance is hardly given to the tubular film unless a suspension tension is applied to the skirt, and it is hard to develop a friction enough to support the suspended weights of the tubular film and the coagulation liquid clinging to and flowing on the film.

On the other hand, in the present invention, a tension endowing ring having a large inside diameter than that of the tubular film is provided at the lower end or at the middle of the cylindrical net, and the tension applied to the cylindrical net is adjusted by applying a force to the ring to make the hole diameter of an elastomeric bottom plate of an annular coagulation liquid vessel equal to the desired diameter of the tubular film and concurrently to balance the throttling friction with the gas pressure inside of the tubular film under coagulation, while keeping its desired diameter, and it is thereby made possible to give an adjusted frictional resistance to the tubular film passing through the cylindrical net. In this respect, the use, object and effect of the present invention are quite different from those of the conventional knit skirt.

The features of the present invention can be enumerated as follows:

(1) The suspended weights of the tubular film and the liquid flowing down and surrounding the film are supported by a throttling friction along all the surface of diameter-adjusted cylindrical net, which surrounds and contacts with the tubular film and is kept balanced with the inner pressure thereof, under an effective tension developed by the controllable suspending tension device. Even if the diameter of the tubular film is changed to some extent, the cylindrical net, by changing its diameter easily in accordance with that of the film, is always in contact with the tubular film and surrounds the film, and the change in the frictional resistance caused by throttling is smaller. The tubular film is thus always supported by the cylindrical net and never undergoes rupturing.

(2) The falling liquid, which surrounds the tubular film, is first of all, in contact with the tubular film in a circular pool formed at an initial coagulating stage so as to coagulate only the surface layer of the film into a harder layer which contacts with the net afterwards to develop the friction, and the channeling of the liquid can be prevented by the successive networks of the net on which the liquid flows. The liquid thereby flows in a turbulent stream and is always agitated by changing its direction of flow at every meshes of the net, without damaging the film, and the coagulating liquid in contact with the film is always renewed.

(3) Even if the suspension length of the tubular film is made necessarily long enough for the extraction of a solvent from the polymer liquid, the suspended weight of the tubular film prepared from said liquid is always supported by the cylindrical net surrounding and contacting with the tubular film and there is no fear of rupturing of the film. The present method can be applied not only to the shaping by melt-extrusion and successive quenching but also to the wet process shaping by solvent extraction and coagulation.

(4) A tubular film of well controlled gauge can be easily obtained, because the drawing force exerted to the polymer liquid just extruded from the annular slit of a die, is relatively small and uniform on entire circumference thereof and because said force exerted from the coagulation side is only the one generated by the weight of the polymer liquid lying uniformly between said slit and the pool of the coagulation liquid on the coagulation liquid vessel before touch with the net as compared with usual process.

(5) By adjusting the suspending tension of the cylindrical net, a tubular film of a wide range of diameter and thickness can be shaped at a wide range of suspended length in the same apparatus.

As described above, the present invention has various prominent features which are unexpectable from the known literatures.

The present invention will be explained hereunder with reference to the accompanying drawings.

FIG. 1 is a view of a cylindrical net suspended under a tension, wherein an upper end of the cylindrical net freely expandable is expanded to a diameter larger than the desired and predetermined diameter of a tubular film and fixed; a ring having a larger inside diameter than said diameter of the tubular film is suspended at the lower end of the cylindrical net; and the diameter of the cylindrical net is adjusted by adjusting the weight suspended at the ring or a tension applied to the ring thereby to give a suitable friction by throttling, to the tubular film having a smaller diameter than inside diameter of the ring and passing through the inside of the cylindrical net, as the more the tension applied to the ring is, the less the diameter of the middle portion of the net is, showing a hyperbolic vertical cross section, as shown in FIG. 2.

FIG. 2 is a vertical cross-sectional view of the apparatus embodying the present invention, wherein the hole at the center of an elastomer plate, that is an annular bottom plate of an annular coagulation liquid vessel, is expanded nearly equal to the diameter of the tubular film to be shaped by means of the cylindrical net suspended under a tension in such a manner as shown in FIG. 1; the tubular film is passed through the inside of the cylindrical net in light contact with the tubular film while balancing the throttling force with the inner pressure; the suspended weight of the tubular film and the force exerted on the surface of the film due to the falling of the coagulation liquid are supported by a frictional resistance developed between the outside surface of the descending tubular film and the inside surface of the cylindrical net; and the coagulation of the tubular film is completed by the agitated stream flowing down through the networks along the cylindrical net.

FIG. 3 shows a case in which the coagulation path is sufficiently long; a suspension ring is provided at the bottom end of the cylindrical net to determine an opening diameter of the elastomer bottom hole of the annular coagulation liquid vessel; and further a cylindrical net diameter-expanding ring is provided at the middle of the coagulation path to prevent the diameter of the cylindrical net from becoming excessively less.

FIG. 4 shows a case in which the coagulation path is likewise long and thus the cylindrical net is also long; a suspension ring is fixed at a relatively upper part of the cylindrical net to produce a tension for determining an opening size of the elastomer bottom hole of the annular coagulation liquid vessel; and thus the cylindrical net below said tension ring is used in a freely suspended skirt-like state.

In FIG. 1, the upper end of a cylindrical net 1 (a net or knit product) having a freely expandable diameter is fixed to a horizontal annular plate 2 having a larger inside diameter than the desired diameter of shaped tubular film, and a ring 3 having a larger inside diameter than the diameter of shaped tubular film is suspended at the bottom end of the cylindrical net. A desired number of weights 4 is suspended at the ring to bring the ring at a horizontal level and to exert an effective tension to the net enough to support the tubular film. The intermediate section 5 of the cylindrical net has a slightly smaller diameter than the diameter of the ring when the suspended weights are light, but takes a shape of a cylindrical net having a relatively larger diameter. In accordance with the increased suspension weights, the section at the middle of the cylindrical net comes to have a much smaller diameter. Similar change of cylindrical net diameter can be effected by lowering the level of the ring 3 or horizontally twisting the ring on the same level. However, in any of these cases, the cylindrical net has a freely adjustable diameter, and thus the expanded tubular film having a smaller diameter than the inside diameter of the ring can be passed through within the cylindrical net while contacting with the net. However, when a tubular film having a certain diameter is passing through in contact with the net and a tension or weight applied to the ring is increased, or the twisting degree of the ring is increased, the frictional resistance becomes larger between the passing tubular film and the inside surface of the cylindrical net. Thus, when a tubular film is extruded from an annular die attached to an extruder and goes down in light contact with the inside surface of the cylindrical net while cooling water is poured onto the descending tubular film, an effective tension of the cylindrical net or an effective twisting degree of the ring, which gives the tubular film a frictional resistance capable of supporting the suspension weight of the tubular film to prevent the non-coagulated part of the tubular film from rupturing, can be readily found out by properly adjusting the tension or weight applied to the ring or the twisting degree of the ring. In such a manner, it can be seen that the weights of the tubular film and suspended coagulation liquid are evenly supported along the entire length of the cylindrical net. This fact is important in that a small tension which is produced by only the weight of uncoagulated portion of the film lying between the die slit and coagulation liquid surface, is imparted evenly to the entire circumference of the annular die slit from the coagulation side and a tubular film having a uniform thickness can easily be prepared, without uneven drawing out of the polymer liquid from the die slit, brought about by uneven cooling of the liquid effect by applying turbulent air stream from an annular nozzle, as seen in the tubular film shaping by conventional blow methods. Even if the diameter of the extruded tubular film is changed to some extent by nature or intentionally, the diameter of the cylindrical net is changed correspondingly and the frictional resistance developed when the tubular film is passed through within the cylindrical net, can well support the tubular film. Accordingly, there is no fear of rupture, that is, interruption during the operation. This fact makes it possible to prepare tubular films having a wide range of diameters by means of the same device to supply the coagulation liquid and the same cylindrical net only by adjusting the tension or weight applied to the ring or the twisting degree of the ring so as to change the opening size of the adjustable elastomer with bottom hole as well as simultaneously to balance the inner pressure of the tubular film. That is to say, the present invention has great industrial and practical values, etc. Furthermore, even in the case that a coagulation path is necessary to be long enough to be able to pinch the film, as in the case of a shaping of high speed quenching or coagulation by solvent extraction, the suspended weight of the entire tubular film can be supported along the full length of the cylindrical net of effective length without any fear of rupture of the suspended tubular film at a place where the film is still soft and weak only by using a longer cylindrical net. Such advantage can be only obtained in the present invention.

In FIG. 2, an actually operated state of an apparatus for shaping a tubular film by wet process is shown, wherein the suspended cylindrical net of FIG. 1 is provided below the annular die.

A horizontal plate 12 having a circular hole of larger diameter than that of the tubular film is provided, sufficiently below an annular die 11 connected to an extruder, coaxially with the die, the distance between said circular hole and the die is determined depending on the diameter of the die and the ratio of blowing up of the annular polymer liquid just extruded therefrom, and a thin rubber sheet 13 having a circular hole of smaller diameter than that of the tubular film coaxially with the die is provided on the plate 12. It is preferable that the part of the rubber sheet 13 surrounding said tube is so made to project downwardly to form a funnel shape. A pliable cylindrical net 14 is provided so as to pass through said hole, and the upper end of the cylindrical net is horizontally extended and placed on the rubber plate. Further, an annular coagulation liquid-distributing vessel 15 is horizontally placed on the extended net coaxially with the annular die, and the extended net and the rubber sheet are water-tightly fixed between the horizontal plate 12 and the bottom of the vessel 15. A coagulation liquid is supplied to the annular vessel 15 from a pipe 16, and the supplied liquid is transferred to an inner annular passage 18 through a submerged slit on the lower end of the partition wall positioned between the vessel 15 and the passage 18 without any turbulence of the liquid surface, and then flows over the inner side wall on to the rubber plate and is retained in a funnel-like liquid channel 17 to form a pool over the net, as stated later. The liquid in the pool 17 forms a free level surface and is in contact with the tubular film not coagulated. An annular ring 19 having a larger inside diameter than that of the tubular film is horizontally suspended at the lower end of the cylindrical net and adjustable weights 20 are further suspended at several parts on the annular ring. As a result, the part of thin rubber sheet 13 surrounding the hole is pulled downward by a tension of the cylindrical net and a circular channel is formed, as shown in FIG. 2, and the part around the hole of the rubber sheet can contact with the tubular film, holding a layer of the cylindrical net between them. Accordingly, the coagulation liquid supplied on to the rubber sheet by overflowing is retained at first in the channel formed between the descending uncoagulated film and the rubber sheet deformed to the funnel-like state to form a circular pool 17 keeping smooth liquid level, and thus the extruded tubular liquid of polymer can come in contact, first, with the coagulation liquid retained in said circular pool before it contacts with the solid but pliable cylindrical net. The outer surface layer of the tubular film, not coagulated yet, immediately starts to coagulate on touching the surface of the liquid in the pool 17. Then, the coagulation liquid must be supplied so that the already coagulated surface may contact successively with the solid cylindrical net, otherwise the surface of the tube is damaged. The coagulation liquid then leaks downwards through meshes of the net held between the tubular film and the rubber sheet and flows downward along the net, and the liquid, flowing down, undergoes continuous change in its direction by the meshes on the net, is stirred and made turbulent. The channeling of the descending liquid stream can be thereby completely prevented, and the liquid goes down along the outside surface of the tubular film, always changing its direction of flow and covering over the surface. The coagulation liquid thus supplied onto the downwards descending tubular film is not in unconfined and free-flowing state but its flow direction is always restricted by the meshes of the circular net contacting with and surrounding said tubular film.

When all of the coagulation liquid necessary to coagulate the film is supplied from the top, there is sometimes an unfavourable case that the liquid surface at the circular pool becomes turbulent, say rippling and a good result for instance, smooth outside surface of the film is not obtained. In that case, the amount of a liquid leaking from the bottom of the funnel-like channel can be limited by using a cylindrical net, made of fine yarns having small mesh and a small net thickness in place of the net with larger meshes, or by covering the larger mesh net with a smaller mesh net or by using a skirt made of fine hanging filaments like the one used in hula. Accordingly, the amount of the coagulation liquid to be supplied by overflowing can be reduced and turbulence of the liquid surface in the circular pool 17 can be minimized. In such a case, the balance of the coagulation liquid is supplied by spraying to the outside of the cylindrical net from a pipe 21 provided below the first coagulation liquid-supplying vessel or supplied by providing the second annular coagulation liquid vessel with a net with larger meshes below the first one, to make up the necessary amount of coagulation liquid.

When the lower ring has a too large diameter, a rubber band 22 having a strength sufficient to narrow the opening of the cylindrical net into a funnel-like state at a level a little higher than the level of the annular ring approximately equal to or a little larger than the expanded hole of the upper elastomer sheet is provided to prevent the lower part of the suspended cylindrical net from being coming apart from the tubular film. When the cylindrical net is throttled in said manner, the diameter of the cylindrical net is made to uniformly touch with the film along its full length, or only the lower part of the cylindrical net is made slightly narrower. However, the rubber band 22 is not essential in the present invention. When the upper rubber plate having a lower elasticity or the ring having a smaller inside diameter but larger than that of the tube under shaping is used, the diameter of the cylindrical net can be maintained uniform while balancing the throttling force with the inside pressure of the tubular film, along the full length of the cylindrical net only by the suspended weight, and there is no fear of rupture of the suspended tubular film.

The tubular film coagulated to a state capable of being pinched is withdrawn from pinch rollers 24 and 24' after passing through guide plates 23 and 23', and after the liquid wetting the film has been removed by the nip of pinch rollers. The waste coagulating liquid is received in a tank 25 and thrown away circulated, if necessary after cooling or adjusting the concentration thereof, etc.

In FIG. 3 is shown a means frequently employed in the case that a long coagulation path is required to effect solvent extraction, as in the case that a liquid of a high concentration of a polymer containing a solvent is extruded from the annular die, or in the case that even in effecting a shaping by quenching a long coagulation path, that is, a long cylindrical net, is required owing to the fact that the tubular film has a large thickness or the shaping must be effected at a high speed. In FIG. 3, the tubular polymer liquid which is a solution or melt 32 extruded from the annular die 31 is expanded by its internal gas pressure and comes, first of all, in contact with a liquid in the circular pool on the annular coagulation liquid vessel 33. After the outer surface of the extruded tubular liquid is somewhat coagulated, the liquid in form of a tube comes in contact with the cylindrical net 34 and coagulation liquid through the hole of the elastomer plate at the bottom of the vessel 33 and then is let to move downward.

A tension of the cylindrical net capable of making the opening size of the hole of the bottom plate equal to the desired diameter can be given by the ring and the weight 36 suspended at the ring 35 positioned at the end of the cylindrical net as well as downward tensions exerted by the weights of the cylindrical net itself and the coagulation liquid flowing downward along the cylindrical net, but as the entire length of the cylindrical net 34 is too long, the diameter of the cylindrical net is made excessively narrower at the middle part of its full length, and consequently, the tubular film 38 tends to be folded at such a narrow part of the cylindrical net. In such a case, expansion rings 37 and 37' are provided at desired level between the levels 33 and 35 to prevent the diameter of the tubular film from excessive narrowing, as shown in FIG. 3.

In FIG. 4 is shown the case that a long coagulation path, that is, a long cylindrical net, is used as in the case of FIG. 3, but a level of arm 46 of a ring 45 fixed to the cylindrical net for giving a tension to the cylindrical net is placed at an upper part of the suspended cylindrical net, by means of suitable arms 46 rigidly but controllably fixed on the support 49 to expand the opening size of the bottom hole of the coagulation liquid vessel to the desired diameter of the tubular film. In any case, the position of the ring to be fixed is not necessary to be the lowest end of the net. In that case, the lower part below the ring level 45 of the long cylindrical net may be in a suspended skirt state. If the weight of the coagulation liquid flowing down along the long cylindrical net is too large, the weight exerts so unfavorable and excessive tension to the suspended cylindrical net skirt that the inside diameter of it may become narrower and that there may be a trouble of folding of the tubular film 48 passing through and contacting with the inside of the cylindrical net skirt. In such a case an expansion ring 47 is provided at the cylindrical new skirt as shown in FIG. 4 to carry out the coagulation smoothly without any trouble. The expansion ring for the cylindrical net is usually is a truly circular state, but even if the ring is in a somewhat polygonal or elliptic state, the cross-section of the cylindrical net is in a nearly truly circular state at the place a certain distance apart from the ring where the tubular film comes in contact with the cylindrical net. In other words, it is not always necessary to use a truly circular ring except for the place where the coagulation of the tubular film is initiated.

In the present invention, it is not necessary to use a cylindrical net having uniform meshes throughout the coagulation process. That is, a cylindrical net having small meshes can be used at the upper section of the coagulation path where a portion of the coagulation liquid is supplied in some cases, and another cylindrical net having large meshes can be connected to the former at a level where the balance of the necessary coagulating liquid is supplied. In another embodiment, the device and operation above the level of the flattening guide plates 23 of FIG. 2 can be repeated again, and another cylindrical net having large meshes can be used for the lower part of the net and the coagulation liquid can be freshly added or supplied at this level. Sometimes, a net of fine yarns with small meshes is placed as a skirt within the net of large meshes at the upper initial coagulation part. In the most cases, a net having 10 to 20 mm. meshes, is used as the cylindrical net to be subjected to a tension. Coarse yarns are used to prepare a net having larger meshes, so that a large amount of water, when let to flow downward, may not flow freely over the outside of the net and not directly fall. Even a small amount of coagulation liquid can effectively be utilized thereby.

As yarns for the net, filament yarns, spun yarns, and stiff filament of any polymer can be used in the net or knit form or similar form.

When a net of small meshes is inserted as a short skirt at the initial stage of coagulation, it is preferable to use yarns of slippery fluorine containing resin (for example, Teflon, a trademark of the fluorine containing resin made by Du Pont, USA). Any ring, irrespective of its weight can be used for the ring suspended at the lower part of the cylindrical net in shaping a tubular film, so far as the ring has diameter larger than the outer diameter of the tubular film to be shaped, but when the weight of the ring is too large, the tension exerted is too high or when the degree of twisting of the net is too large, the resistance against the passing tubular film though the net becomes too large and as a result, the tubular film is deformed to fold during the coagulation process or the coagulated layer is stretched. Thus, an unfavourable result is brought about in the product. Usually, the weights suspended or downward force applied to the ring should be determined by taking into consideration that total amount of the tension, exerted by the weight of cylindrical net itself, the weight of the suspended ring, the coagulation liquid flowing down along the net, and additionally suspended weights or applied tension to the ring, makes the opening size of the bottom hole of the annular coagulation liquid vessel large enough to be equal to the desired diameter of the tubular film as well as makes the throttling force of the net balance with the inner pressure of the tube although the total tension may vary according to the thickness, namely strength of the elastomer plate. The tension ring can be fixed at any level of the cylindrical net throughout the full length thereof, and an expansion ring for the cylindrical net can be inserted where the cylindrical net is too much narrowed as in the case where total tension is excessively large due to the strong and thick elastomer plate.

To adjust the opening of the cylindrical net, the length of the cylindrical net can be adjusted by a twisting mechanism beside the suspended weight as described above. The lower ring may be horizontally twisted while keeping the level of the lower ring constant from the outside, or the level of the ring may be lowered. A proper tension applied to the cylindrical net can be readily determined by experiment. Application of the methods embodied in FIGS. 3 and 4 even to the case that the length of the cylindrical net is large even in shaping by quenching coagulation at a high shaping speed or to the case that a long cylindrical net is required to effect the coagulation because it takes much time to do so owing to the wet process coagulation, has been already explained above.

In FIG. 2 is shown a case that the tubular polymer extruded from the annular die is directly subjected to the initial coagulation according to the present invention, but the scope of the present invention is not limited to said case. The tubular polymer extruded from the annular die can be subjected to an initial coagulation by injecting cold air thereto or spraying a liquid or pouring a liquid thereto, and then to complete coagulation according to the present invention as embodied in FIG. 2. Such case, although seldom is included in the scope of the present invention.

The present invention can be utilized not only in the case that a distance from extrusion to pinching is short, as in the case that polyamide, polyester, polypropylene, polyethylene, polystyrene, polyvinyl chloride containing a plasticizer, or the like polymer is melted, extruded and immediately solidified by water cooling to make a thin tubular film, but also to the case of shaping a tubular film by wet process coagulation which necessitates a distance of 3 to 5 m. from extrusion to pinching for coagulation of the polymer liquid sufficiently enough to be pinched, as in the case that a concentrated solution of polyacrylonitrile or polyvinyl chloride or their copolymer dissolved in a solvent is extruded, shaped and subjected to solvent extraction using water. Further, the present invention is also applicable to the wet process shaping of a solution of polyvinyl alcohol or cellulose, where a dehydration-coagulation salt bath is used to shape a film.

The thus obtained tubular film has an advantage of uniform thickness, and can be used as a non-stretched film. Further, the present invention is a particularly desirable primary shaping method for the tubular film in that the tubular film has less uneven thickness as a raw material film for the uniaxial or biaxial after-stretching And moreover a high speed shaping of a tubular film of large diameter, irrespective of the thickness thereof, can easily be put into practice, according to the method of the present invention.

The present invention will be explained hereunder in detail with reference to examples.

EXAMPLE 1

A molten polypropylene at 230° C. was extruded downward from an annular die having a diameter of 10 cm. using an apparatus as shown in FIG. 2 and expanded by an internal pressure to a diameter of 12 cm. until it reached the circular water pool on the annular coagulation vessel 10 cm. below the die. The cylindrical net is 1 m. long from the circular water pool, and a ring of light metal round-bar having an inner diameter of 18 cm. was suspended at the bottom end of the cylindrical net. An expanded tubular film having a diameter of 12 cm. was passed through the inside of the net in advance, and water was let to flow down. Weights, which were adjusted so that the tubular film could lightly move when it was pulled downward but stop to fall naturally when not pulled, were suspended at the ring, and fine adjustment was effected by twisting the ring after the ring has been fixed to the net.

The cylindrical polyamide (nylon 6) net with 1 cm. meshes, was used, and a net having small meshes of 250 denier yarn of polyethylene-tetra-fluoride polymer was placed on the inside surface of the upper part of the former net and used as a suspended skirt. Water at room temperature, 15° C., was supplied only from the upper part, and no make-up water supply was effected at all from the pipe 21.

A rubber band, which made the lower part of the cylindrical net narrow, was so adjusted that the lower part of the net became approximately equal to the opening size of the bottom of the upper circular water pool, namely funnel-like opening of the elastomer plate 13 when operated. Pinch rollers 24 and 24′ were positioned at a level 1.5 m. below the die, and the tubular film was flattened by the guide plates and withdrawn.

Uneven tension between the part of film sliding on the guide plates and the part of film not in contact with the guide plates or uneven direction of the tension applied to the cylindrical part of the film owing to the force on the film exerted in the course of flattening of the film were overcome by the friction of the cylindrical net, and a uniform tension was applied to the annular die slit throughout its entire circumference by the use of the cylindrical net. Consequently, a tubular film having less uneven thickness (less than 5%) was obtained as a product. The thickness of the product was 0.20 mm., and the shaping speed was 30 m./min. By applying after-stretching (10 times the original area) to the film, a stretched film having an even thickness of 0.02 mm. was obtained.

When a high density polyethylene was solidified by water cooling in the same manner as above, a flexible product having less uneven thickness and a high transparency was obtained at almost same conditions with polypropylene.

EXAMPLE 2

A film was prepared from stylon 475 (a trademark of high impact polystyrene made by Asahi-Dow, Japan) in the same manner as in Example 1. In this case, room temperature water was supplied from the top to effect necessary quenching to the surface of the tube just extruded, and excessive water of 85° C. was additionally supplied to the film at the lower part from the tube 21. The withdrawing speed was 20 m./min. In that case, the temperature of the tubular film at the pinching part was not lower than 85° C., and thus no white flexing traces of pinching were developed. Even if there were some traces, such flexing traces could be eliminated by subjecting the film to after-stretching (10 times the original area) by a biaxial after-stretching method of an internal pressure inflation with saturated steam to prepare a film having a thickness of 0.017 mm.

EXAMPLE 3

58% by weight of polyacrylonitrile having an average degree of polymerization of 1400 and 42% by weight of dimethylsulfoxide were mixed in a kneader initially at 30° C. and then at 150° C. to form pellets. The pellets were melted in a melting section of an extruder (not shown) at 180° C. and extruded from a die at 150° C. with an apparatus shown in FIG. 3. The tubular liquid, extruded from the die having an annular slit 10 cm. in diameter, was inflated to 12 cm. in diameter by the internal pressure and made to reach to a water level of the liquid pool provided 7.5 cm. below the die. Room temperature water (10° C.) was supplied to the coagulation vessel. A short cylindrical net with small meshes having a length of 0.5 m. was placed on the inside of the cylindrical net under tension. The long cylindrical net of large meshes suspended from the annular coagulation vessel by the weight had a length of 3.5 m., and three expansion rings for the long cylindrical net were provided at equal interval along the full length of the net. Suspending tension of the long cylindrical net was adjusted so that the tubular film could be withdrawn without much resistance when pulled downward but could not fall by nature when not pulled. The distance from the die to the pinch rollers was about 4.5 m. The falling water was in a stirred and turbulent stream through the meshes. After pinching, the film was transferred into washing bath (not shown) and water-washed, while running over rollers in a distance of 6 m. in the bath, to effect sufficient extraction of the solvent. The thus obtained tubular film had a thickness of 0.15 mm. and a width of 18 cm. when flattened. The tubular film was sufficiently coagulated until it was pinched, and there was no trouble for returning the flattened tube to the round tube. An excellent product having an even thickness was obtained by subjecting the tubular film to uniaxial stretching and successive preparation of split fibers or biaxial stretching of an internal pressure inflation with saturated steam at 100° C.

What is claimed is:

1. A method for shaping a tubular film wherein a tubular polymer liquid is extruded downward from an annular die, inflated by internal gas pressure and the outside surface of the polymer liquid comes in contact with a coagulating liquid to shape a tubular film, which comprises using at least one coagulation liquid vessel in series which has solid bottom plate having a circular hole, the diameter of which hole is larger than that of a tubular film to be shaped, and which hole is situated coaxially with an annular die through which the tubular film is formed, said vessel being equipped with means to supply a coagulation liquid evenly onto the bottom plate and with an elastomer plate having a circular hole, the diameter of which hole is smaller than that of the tubular film, and said vessel being fixed onto said solid bottom plate watertightly and coaxially with said annular die; providing a cylindrical net so as to pass it through the elastomer hole; enlarging the upper end of the cylindrical net so as to cover the upper surface of the elastomer plate; fixing thus enlarged end of the net onto said solid bottom plate together with the elastomer plate so as to be able to expand the bottom hole of the elastomer plate over the original diameter thereof and to form a funnel-like opening by a downward tension applied to the net; fixing a ring having a larger inner diameter than that of the tubular film, at a given distance along the length of the cylindrical net applying a downward tension to the cylindrical net through the ring sufficient to adjust the opening size of the bottom hole of the elastomer plate approximately equal to the diameter of the tubular film; allowing the extruded tubular liquid to go into a partial coagulation process, while supplying the coagulation liquid to the coagulation liquid vessel and subjecting said liquid to flowing along the inside of the funnel-like opening of the cylindrical net lying over the elastomer plate so as to allow the extruded tubular liquid to come, first of all, in contact with the coagulation liquid, having free level and retained in a circular pool formed, at the top, between the outside surface of the tubular liquid and the inner wall of the funnel-shaped elastomer plate holding said net therebetween; after the outside surface of the tubular liquid has initiated to coagulate, subjecting the tubular liquid to complete coagulation into a shaped tubular film by contacting with the coagulation liquid leaking down through the meshes of the net at the bottom of the pool and flowing down along the full length thereof, with which the coagulated surface of the tubular liquid is kept in light contact so that the throttling force of the net may be kept balanced with the pressure inside the tubular liquid, while supporting the suspended weight of the tubular film and the downward-force, exerted to the film surface due to the flowing of the coagulation liquid thereon, by a frictional resistance developed between descending tubular film and the cylindrical net kept under an adjusted tension; and withdrawing the shaped tubular film through pinch rollers after passing through the lower end of the cylindrical net.

2. A method according to claim 1, wherein the tension of the cylindrical net is adjusted by applying controlled downward force to the ring.

3. A method according to claim 1, wherein the tension of the cylindrical net is adjusted by twisting the ring to a desired degree.

4. A method according to claim 1, wherein the diameter of the cylindrical net is adjusted by inserting at least one expansion ring between the elastomer plate and the lower end of the cylindrical net.

5. A method according to claim 11, wherein another shorter soft and pliable net with smaller meshes is suspended along the inside of the net on the funnel- shaped elastomer plate.

6. A method according to claim 1, wherein a short skirt made of layers of fibers like skirt of hula is suspended along the inside of the net on the funnel shaped elastomer plate.

7. A method according to claim 1, wherein at least one ring is provided at a level higher than the lower end of the cylindrical net and the part of the cylindrical net hanging downwards from the ring is in a suspended skirt state.

8. A method according to claim 1, wherein the coagulation liquid is supplied in a quantity sufficient to coagulate the surface layer of the extruded tubular liquid, and the balance of the coagulation liquid necessary to effect substantial coagulation, is supplied to the cylindrical net below the coagulation liquid vessel.

References Cited

UNITED STATES PATENTS

| | | | |
|---|---|---|---|
| 3,090,998 | 5/1963 | Heisterkamp et al. | 264—95 |
| 3,207,823 | 9/1965 | Glyde et al. | 264—95 |

FOREIGN PATENTS

| | | | |
|---|---|---|---|
| 98,090 | 5/1964 | Denmark | 264—95 |
| 596,253 | 4/1960 | Canada | 264—99 |

ROBERT F. WHITE, Primary Examiner

T. J. CARVIS, Assistant Examiner

U.S. Cl. X.R.

18—14